United States Patent
Pitisi et al.

(10) Patent No.: US 6,299,041 B1
(45) Date of Patent: Oct. 9, 2001

(54) HOLDING DEVICE FOR A CORDLESS TELEPHONE

(75) Inventors: Christian Pitisi, Lipsheim; Frédéric Rubach, Blaesheim, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/433,722

(22) Filed: Nov. 4, 1999

(30) Foreign Application Priority Data

Nov. 9, 1998 (EP) .................................... 98440252

(51) Int. Cl.$^7$ ........................................ A45F 5/00
(52) U.S. Cl. ................... 224/271; 224/197; 224/272; 224/930; 379/446; 379/455
(58) Field of Search .................. 224/195, 196, 224/197, 268, 271, 272, 930; 379/446, 455, 454, 426, 449

(56) References Cited

U.S. PATENT DOCUMENTS

| | | | |
|---|---|---|---|
| 3,743,147 | * 7/1973 | Wilczynski | 224/221 X |
| 5,054,170 | * 10/1991 | Otrusina | 24/597 |
| 5,168,982 | * 12/1992 | Hakanen et al. | 200/342 |
| 5,620,120 | * 4/1997 | Tien | 224/199 |
| 5,730,342 | * 3/1998 | Tien | 224/271 |
| 5,768,371 | * 6/1998 | Snyder | 379/446 |
| 5,850,954 | * 12/1998 | Dong-Joo | 224/197 |
| 5,988,577 | * 11/1999 | Phillips et al. | 248/231.81 |
| 6,058,185 | * 5/2000 | Alanara | 379/446 |
| 6,059,156 | * 5/2000 | Lehtinen | 224/197 |

FOREIGN PATENT DOCUMENTS 0 777 371 A1   6/1997 (EP) .

* cited by examiner

*Primary Examiner*—Stephen K. Cronin
(74) *Attorney, Agent, or Firm*—Sughrue, Mion, Zinn, Macpeak & Seas, PLLC

(57) ABSTRACT

The invention relates to a holding device for a cordless telephone with a first holding element (3) on a garment, especially on a belt, and a second holding element (5) on the telephone. In order to enable comfortable handling, it is intended that the first holding element (3) comprises a projecting hook (4) and the second holding element (5) an opening (6) in the housing for the lockable receipt of the hook (4).

15 Claims, 1 Drawing Sheet

HOLDING DEVICE FOR A CORDLESS TELEPHONE

BACKGROUND OF THE INVENTION

The invention relates to a holding device for a cordless telephone. A holding device, where the telephone is provided with a hook-element projecting from its casing, which is quasi-insertable into a corresponding projection of a belt, is known. The hook-element is considered to be undesirable not merely for aesthetic reasons. It also impedes the handling of the telephone in respect of both handling by the user and in a charging-station compared with a cord connected base-unit. Furthermore, hanging up the telephone necessitates a certain skill and without visual-contact can be effected only with difficulty.

SUMMARY OF THE INVENTION

It is the object of the invention to remove the disadvantages noted above and to declare a holding device which distinguishes itself with agreeable aesthetics and trouble-free handling.

The object is achieved in accordance with the invention by a holding device for a cordless telephone including a first holding element on a garment and a second holding element on the telephone, wherein the first holding element comprises a projecting hook and the second holding element comprises a the telephone housing for lockably receiving the hook. mobile-part of a conventional telephone—is only provided with an opening in the housing, which grips a hook, especially a belt-hook, and permits a secure attachment of the telephone. Projecting parts, which interfere with handling or a fixed installation, are not necessary. The casing-surface of the telephone is almost smooth and consequently also corresponds to the usual aesthetic ideas.

Preferably, the hook, which projects negligibly into the inside of the telephone, additionally serves to switch the telephone on and off. For this, the hook can operate a switch-element directly or can act on the switch-element indirectly by way of further movable parts.

In order to signal the locking, by which the telephone is held securely to, for example, the belt, acoustic and/or mechanical indicators can be provided. For example, a type of latching mechanism can be provided, which signals the locking through an audible stop or a perceptible latching resistance.

The opening in the housing of the telephone is preferably formed as a slot with an enlarged end area. In this way the opening in the housing can be comfortably placed over the hook, so that even a "blind" suspension and latching is possible.

The opening in the housing can be closed from the inside by means of a spring closure. By this means, a secure protection against possible contamination of the internally located components of the telephone is achieved. The spring closure is pressed inwards when hanging on the hook and again effects a seal against the inner edges of the opening in the housing when the telephone is removed.

An especially good contamination-protection is provided when, in accordance with an advantageous embodiment, the spring closure has an elastic membrane. The membrane guarantees that, even in the suspended condition, there is no opening-area into the interior of the telephone. For this, the membrane is attached in the latching area at a suitable distance from the edge of the opening. In this way, sufficient freedom of movement is given for the top of the hook to penetrate into the latching position.

In accordance with one advantageous embodiment, the spring closure is formed as a leaf-spring. The leaf-spring, which is depressed with its free end into the interior of the telephone when hanging up the telephone, can simultaneously function with this free end as a switch for turning the telephone on and off.

In accordance with another advantageous embodiment, the spring closure is formed as a spring-operated mechanical shutter. The shutter can be formed as a flap or cover and be pressed into its closed position by a screw-spring or a leaf-spring.

BRIEF DESCRIPTION OF THE DRAWINGS

The invention is explained in more detail below by means of an embodiment shown in the drawing. This shows.

DETAILED DESCRIPTION OF THE INVENTION

Figure 1:
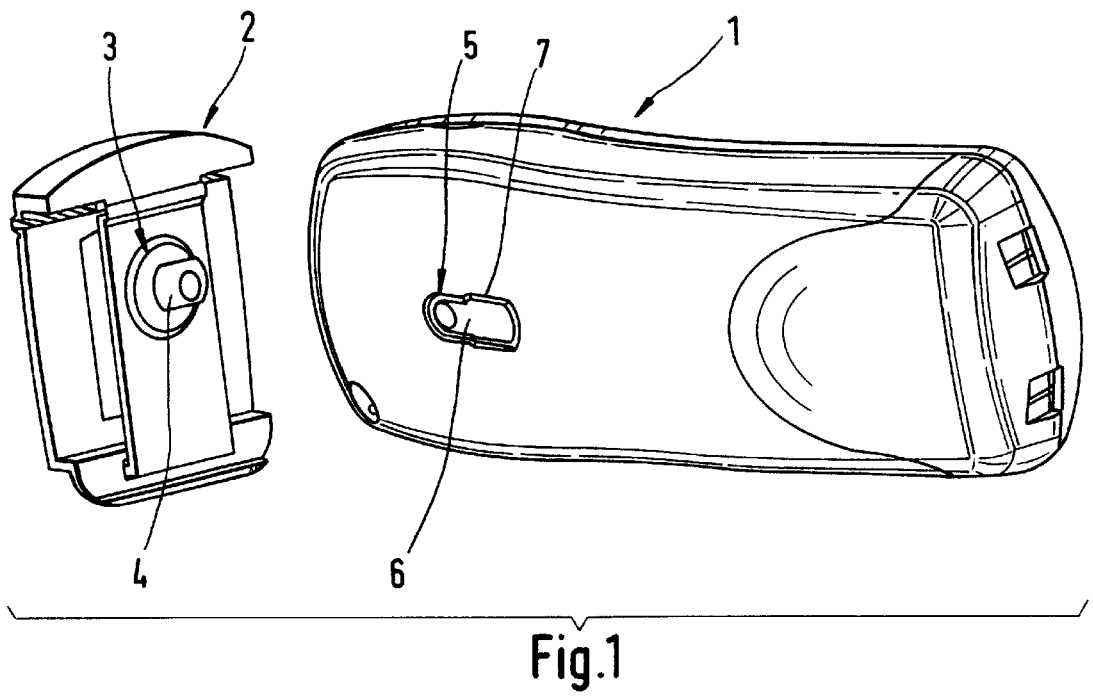
FIG. 1 a telephone and an associated belt-buckle.

FIG. 1 shows the invention-relevant components of a mobile phone 1 which is to be attached to a belt-buckle 2. The belt-buckle 2 is provided with first holding elements 3, which comprise a projecting hook 4. The first holding elements 3 of the belt-buckle 2 are assigned to second holding elements 5 of the portable phone 1. The second holding elements 5 are essentially formed as an opening in the housing 6 which can accommodate hook 4 with the portable phone 1 in the horizontal position. For this, the opening in the housing 6 is designed as a slot with a widened end area 7. After insertion, the portable phone 1 can be rotated into the vertical position to lock it. Removal of the portable phone 1 from the belt-buckle 2 takes place in the reverse sequence.

Figure 2:
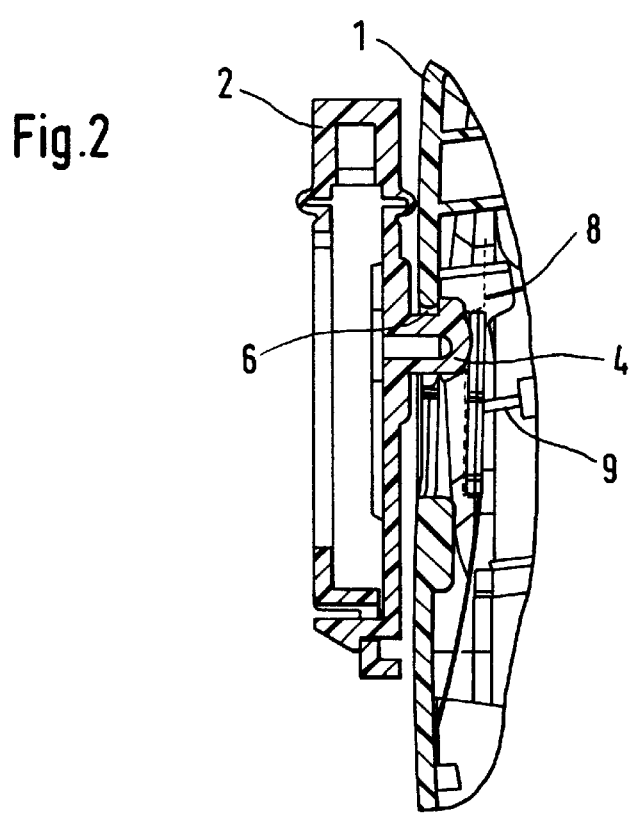
FIG. 2 a diagrammatic cross-section through the holding elements in the secured condition.

The bolted position is illustrated in FIG. 2 in a cutaway diagram. It can be seen that the hook 4 presses a spring closure 8 into the interior of the portable phone 1. In the unlocked condition the spring closure 8 lies flat tightly against the inner edges of the opening in the housing 6, as a result of which these are protected against the effects of dirt and liquids. Besides the protective function, the spring closure 8 can also effect a switching function, with which a switch lever 9 is operated in the locked condition, which additionally turns off the portable phone 1. Switching on of the portable phone 1 is effected with the unlocking, by means of which the spring closure 8 of the switch lever 9 is uncoupled.

The invention is not restricted to the foregoing exemplary embodiment. Rather a number of variations is possible, which also make use of the characteristics of the invention even with fundamentally different implementations of the application.

What is claimed is:

1. Holding device for a cordless telephone with a first holding element (3) on a garment, especially a belt, and a second holding element (5) on the telephone, characterised in that the first holding element (3) comprises a projecting hook (4) and the second holding element (5) comprises an opening (6) in the housing for the lockable receipt of the hook (4), wherein the opening in the housing is provided with a spring closure (8) supported on one of its inner edges.

2. Holding device in accordance with claim 1, characterised in that the first and the second holding elements (3 and 5) cooperate as an ON/OFF switch for the telephone, where the hook (4) operates a switch-element in the area of the opening (6) in the housing.

3. Holding device in accordance with claim 1, characterised in that at least one of the first and the second holding element (3; 4) comprise(s) means for at least one of acoustic and mechanical signalling that locking has been effected.

4. Holding device in accordance with claim 1, characterised in that the opening (6) in the housing is shaped as a slot with a widened end area (7).

5. Holding device in accordance with claim 1, characterised in that the spring closure (8) is formed as an elastic membrane.

6. Holding device in accordance with claim 1, characterised in that the spring closure (8) is formed as a leaf-spring.

7. Holding device in accordance with claim 1, characterised in that the spring closure (8) is in the form of a spring-operated mechanical closure.

8. A holding device for a cordless telephone, comprising:
- a first holding element that is arranged on a garment and that comprises a projecting hook; and
- a second holding element that is arranged on the cordless telephone and that comprises an opening in a housing of the cordless telephone for a locked receipt of the hook;

wherein the opening in the housing is provided with a spring closure that is supported on an inner edge of the opening.

9. The holding device of claim 8, wherein the garment comprises a belt.

10. The holding device of claim 8,
- wherein the first and second holding elements are configured to cooperate as an ON/OFF switch for the cordless telephone; and
- wherein the hook is configured to operate as a switch-element in an area of the opening in the housing.

11. The holding device of claim 8, wherein at least one of the first and the second holding elements comprises means for at least one of acoustic signaling and mechanical signaling to indicate that locking of the cordless telephone has been effected.

12. The holding device of claim 8, wherein the opening in the housing has a shape of a slot with a widened end area.

13. The holding device of claim 8, wherein the spring closure comprises an elastic membrane.

14. The holding device of claim 8, wherein the spring closure comprises a leaf-spring.

15. The holding device of claim 8, wherein the spring closure comprises a spring-operated mechanical closure.

* * * * *